US009274652B2

(12) United States Patent
Chang et al.

(10) Patent No.: US 9,274,652 B2
(45) Date of Patent: Mar. 1, 2016

(54) APPARATUS, METHOD, AND MEDIUM FOR SENSING MOVEMENT OF FINGERS USING MULTI-TOUCH SENSOR ARRAY

(75) Inventors: Wook Chang, Yongin-si (KR); Seong-il Cho, Yongin-si (KR); Joon-ah Park, Yongin-si (KR); Byung-seok Soh, Yongin-si (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 1466 days.

(21) Appl. No.: 11/723,937

(22) Filed: Mar. 22, 2007

(65) Prior Publication Data

US 2007/0268269 A1    Nov. 22, 2007

(30) Foreign Application Priority Data

May 17, 2006    (KR) .......................... 10-2006-0044418

(51) Int. Cl.
G06F 3/041    (2006.01)
G06F 3/044    (2006.01)
G06F 3/0485    (2013.01)

(52) U.S. Cl.
CPC .............. *G06F 3/044* (2013.01); *G06F 3/0416* (2013.01); *G06F 3/0485* (2013.01)

(58) Field of Classification Search
CPC ...... G06F 3/0416; G06F 3/044; G06F 3/0485
USPC .................................................. 345/170–176
See application file for complete search history.

(56) References Cited

U.S. PATENT DOCUMENTS

| 5,189,732 | A | * | 2/1993 | Kondo ........................... 715/840 |
| 2002/0093491 | A1 | * | 7/2002 | Gillespie et al. ............... 345/173 |
| 2005/0017959 | A1 | * | 1/2005 | Kraus et al. .................... 345/173 |
| 2005/0057524 | A1 | * | 3/2005 | Hill et al. ....................... 345/173 |

(Continued)

FOREIGN PATENT DOCUMENTS

| JP | 7-64696 | 3/1995 |
| JP | 2003-46383 | 2/2003 |

(Continued)

OTHER PUBLICATIONS

Office Action issued in corresponding Korean Patent Application No. 10-2006-0044418, on Sep. 27, 2007.

*Primary Examiner* — Quan-Zhen Wang
*Assistant Examiner* — Tony Davis
(74) *Attorney, Agent, or Firm* — Staas & Halsey LLP (57) ABSTRACT

A sensing technique using a capacitance touch sensor as a user interface is provided. An apparatus for sensing the movement of fingers using a multi-touch sensor includes a touch determination module which determines whether a user has actually touched a touch sensor comprising one or more touch points with at least one of his/her fingers, a clustering module which groups a plurality of electrodes arrayed in the touch sensor into one or more clusters according to a set of standards if the touch determination module determines that the user has actually touched the touch sensor with at least one of his/her finger, a position value calculation module which calculates a finger position value indicating the location of the finger of the user that touches the touch sensor for each of the clusters, and a movement information detection module which detects movement information of the finger of the user that touches the touch sensor using information regarding variations over time in the finger position value.

16 Claims, 9 Drawing Sheets
(1 of 9 Drawing Sheet(s) Filed in Color)

(56) References Cited

U.S. PATENT DOCUMENTS

| | | | |
|---|---|---|---|
| 2005/0104867 A1* | 5/2005 | Westerman et al. | 345/173 |
| 2006/0026536 A1* | 2/2006 | Hotelling et al. | 715/863 |
| 2006/0038813 A1* | 2/2006 | Dohta | 345/419 |
| 2006/0097991 A1* | 5/2006 | Hotelling et al. | 345/173 |
| 2006/0221061 A1* | 10/2006 | Fry | 345/173 |
| 2007/0116333 A1* | 5/2007 | Dempski et al. | 382/128 |
| 2007/0165005 A1* | 7/2007 | Lii et al. | 345/173 |
| 2007/0211050 A1* | 9/2007 | Ohta | 345/426 |

FOREIGN PATENT DOCUMENTS

| | | |
|---|---|---|
| KR | 10-2002-0006984 | 1/2002 |
| KR | 10-2006-0041576 | 5/2006 |
| WO | 96/18179 | 6/1996 |

* cited by examiner

LOCATION : 1 2 3 4 5 6 7 8
OUTPUT : 0 1 0 0 0 0 0 0

FINGER POSITION VALUE OBTAINED USING WEIGHTED
AVERAGE METHOD : 2

— 302

LOCATION : 1 2 3 4 5 6 7 8
OUTPUT : 0 0 1 0 0 0 0 0

FINGER POSITION VALUE OBTAINED USING WEIGHTED
AVERAGE METHOD : 3

— 304

LOCATION : 1 2 3 4 5 6 7 8
OUTPUT : 0 0 0 1 1 0 0 0

FINGER POSITION VALUE OBTAINED USING WEIGHTED
AVERAGE METHOD : 4.5

— 306

LOCATION : 1 2 3 4 5 6 7 8
OUTPUT : 1 1 0 0 0 1 0 0

FINGER POSITION VALUE OBTAINED USING WEIGHTED
AVERAGE METHOD : ?

— 308

FIG. 3B (a) OUTPUT OF TOUCH SENSOR IC (b) OUTPUT OF CLUSTERING MODULE

APPARATUS, METHOD, AND MEDIUM FOR SENSING MOVEMENT OF FINGERS USING MULTI-TOUCH SENSOR ARRAY

CROSS-REFERENCE TO RELATED APPLICATIONS

This application claims the benefit of Korean Patent Application No. 10-2006-0044418 filed on May 17, 2006 in the Korean Intellectual Property Office, the disclosure of which is incorporated herein by reference in its entirety.

BACKGROUND OF THE INVENTION

1. Field of the Invention

The present invention relates to a sensing technique using a capacitance touch sensor as a user interface, and more particularly, to an apparatus, method, and medium for sensing the movement of fingers using a touch sensor capable of sensing at least one touch point in which a signal output by a multi-touch sensor is analyzed, the number of a user's fingers that touch the multi-touch sensor and the movement of the fingers are detected based on the results of the analysis, and a scroll operation performed by the user is determined based on the results of the detection.

2. Description of the Related Art

Press switches widely used in home appliances or liquid crystal monitors have been increasingly replaced by touch switches. Touch switches generally include an electrode which is installed beneath a front cover. Thus, touch switches sense variations in the capacitance between an electrode and a user who touches the electrode, and provide the results of the sensing to microprocessors or microcomputers as switch signals.

Touch switches are classified into touch switches that sense variations in the capacitance between an electrode installed in each of the touch switches and a finger of a person who touches the electrode and touch switches that sense inductance variations or impedance variations.

Touch sensors that sense capacitance variations react not only to a user's fingers but also to other parts of the user's body or other conductive materials, thereby causing touch user interface systems equipped with such touch sensors to malfunction. In order to address this problem, a variety of techniques of improving the reliability of touch sensors through sensor signal processing have been suggested, and examples of these techniques are as follows.

First, there is a technique of improving the reliability of touch sensors through sensor signal processing that involves recognizing whichever of a plurality of touch sensors has been least recently fired is recognized when the touch sensors are all fired. This technique, however, may cause malfunctions especially when a signal output by whichever of a plurality of touch sensors has been least recently fired is noise (for example, when a scroll operation is performed when a user accidentally touches a touch sensor).

Second, there is a technique of improving the reliability of touch sensors through sensor signal processing. This technique aims at improving the reliability of touch user interfaces through multi-touch sensing, thereby enabling a touch screen capable of sensing only one touch point to be able to sense more than one touch point through signal processing. In detail, in this technique, estimated X and Y coordinates are determined based on the intensities of signals input from the X- and Y-axes of a touch screen, and whichever of a plurality of pairs of X and Y coordinates that can be generated based on the estimated X and Y coordinates is most reliable is determined as a final pair of coordinates. According to this technique, it is possible to determine whether one or more touch points are currently detected based on signals received from a touch screen, determine the position of each detected touch point, and determine which of a plurality of touch points that have been detected is a valid touch point. However, since conventional touch sensors can only detect a single touch point at a time, the number of touch points that can be detected using this technique is limited to a maximum of 2. Therefore, when two or more touch sensor signals are generated due to unintentional touches by a user's hand or fingers, it is difficult to detect intentional touches by the user's hand or fingers using this technique. Thus, the performance of the detection of touch signals generated by intentional touches by a user's hand or fingers considerably decreases.

SUMMARY OF THE INVENTION

Additional aspects, features, and/or advantages of the invention will be set forth in part in the description which follows and, in part, will be apparent from the description, or may be learned by practice of the invention.

The present invention provides an apparatus, method, and medium for sensing the movement of fingers of a user using a multi-touch sensor which can effectively detect touch signals generated by a scroll operation intentionally performed by a user from touch sensor signals containing noise and can filter out touch signals generated by unintentional touches by the user.

According to an aspect of the present invention, there is provided an apparatus for sensing the movement of fingers using a multi-touch sensor. The apparatus may include a touch determination module which determines whether a user has actually touched a touch sensor comprising one or more touch points with at least one of his/her fingers, a clustering module which groups a plurality of electrodes arrayed in the touch sensor into one or more clusters according to a set of standards if the touch determination module determines that the user has actually touched the touch sensor with at least one of his/her finger, a position value calculation module which calculates a finger position value indicating the location of the finger of the user that touches the touch sensor for each of the clusters, and a movement information detection module which detects movement information of the finger of the user that touches the touch sensor using information regarding variations over time in the finger position value.

According to another aspect of the present invention, there is provided a method of sensing the movement of fingers using a multi-touch sensor. The method may include (a) determining whether a user has actually touched a touch sensor comprising one or more touch points with at least one of his/her fingers, (b) grouping a plurality of electrodes arrayed in the touch sensor into one or more clusters according to a set of standards if it is determined in (a) that the user has actually touched the touch sensor with at least one of his/her finger, (c) calculating a finger position value indicating the location of the finger of the user that touches the touch sensor for each of the clusters, and (d) detecting movement information of the finger of the user that touches the touch sensor using information regarding variations over time in the finger position value.

According to another aspect of the present invention, there is provided an apparatus for sensing a movement of at least one finger, the apparatus including: a touch determination module which determines whether a user has actually touched a touch sensor comprising one or more touch points with at least one finger; a clustering module which groups a plurality of electrodes arrayed in the touch sensor into one or more clusters if the touch determination module determines that the user has actually touched the touch sensor with at least one finger; a position value calculation module which calculates a finger position value indicating the location of the at least one finger of the user that touches the touch sensor for each of the clusters; and a movement information detection module which detects movement information of the at least one finger of the user that touches the touch sensor using information regarding variations over time in the finger position value.

According to another aspect of the present invention, there is provided a method of sensing a movement of at least one finger, the method including: (a) determining whether a user has actually touched a touch sensor comprising one or more touch points with at least one finger; (b) grouping a plurality of electrodes arrayed in the touch sensor into one or more clusters if it is determined in (a) that the user has actually touched the touch sensor with at least one finger; (c) calculating a finger position value indicating the location of the at least one finger of the user that touches the touch sensor for each of the clusters; and (d) detecting movement information of the at least one finger of the user that touches the touch sensor using information regarding variations over time in the finger position value.

According to another aspect of the present invention, there is provided an apparatus for sensing a movement of fingers, the apparatus including: a touch determination module which determines whether a user has touched a touch sensor comprising one or more touch points with at least one finger; a clustering module which groups a plurality of electrodes arrayed in a touch sensor into one or more clusters if the user has actually touched the touch sensor with at least one finger, wherein the electrodes are grouped into one or clusters based on the number of electrodes arrayed in the touch sensor, the sum of the intensities of digital signals respectively output by the electrodes of the touch sensor, or a combination thereof; a position value calculation module which calculates a finger position value indicating the location of the at least one finger of the user that touches the touch sensor for each of the clusters; and a movement information detection module which detects movement information of the at least one finger of the user that touches the touch sensor based on variations over time in the finger position value.

According to another aspect of the present invention, there is provided a method of sensing a movement of at least one finger, the method including: (a) grouping a plurality of electrodes arrayed in a touch sensor into one or more clusters when a user has actually touched the touch sensor with at least one finger, wherein the electrodes are grouped into one or clusters based on the number of electrodes arrayed in the touch sensor, the sum of the intensities of digital signals respectively output by the electrodes of the touch sensor, or a combination thereof; (b) calculating a finger position value indicating the location of the at least one finger of the user that touches the touch sensor for each of the clusters; and (c) detecting movement information of the at least one finger of the user that touches the touch sensor based on variations over time in the finger position value.

According to another aspect of the present invention, there is provided at least one computer readable medium storing computer readable instructions that control at least one processor to implement the methods of the present invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee. These and/or other aspects, features, and advantages of the invention will become apparent and more readily appreciated from the following description of exemplary embodiments, taken in conjunction with the accompanying drawings of which.

DETAILED DESCRIPTION OF THE PREFERRED EMBODIMENTS

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Exemplary embodiments of an apparatus, method, and medium of sensing the movement of fingers using a multi-touch sensor according to the present invention will hereinafter be described in detail with reference to the accompanying drawings.

According to an exemplary embodiment of the present invention, a multi-touch sensor which is a touch sensor capable of sensing at least one touch point at a time can be used, and a user interface of the multi-touch sensor can be manipulated using part of the human body, for example, the fingers.

Figure 1:
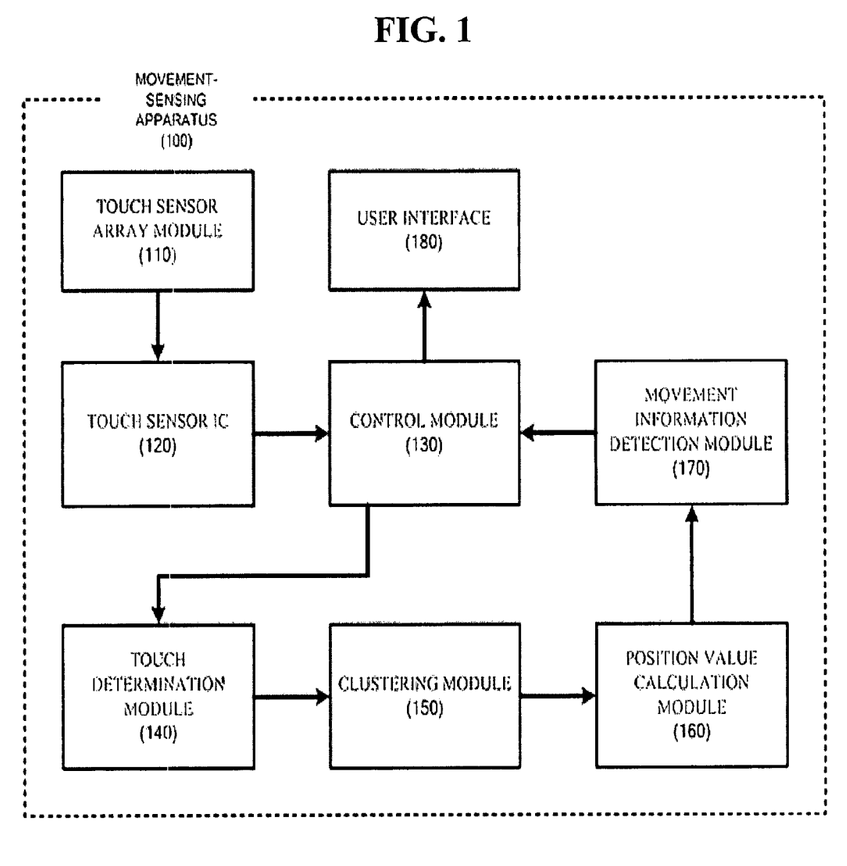
FIG. 1 is a block: diagram of an apparatus for sensing the movement of fingers using a multi-touch sensor according to an exemplary embodiment of the present invention.

FIG. 1 is a block diagram of an apparatus 100 for sensing the movement of fingers using a multi-touch sensor according to an exemplary embodiment of the present invention. Referring to FIG. 1, the apparatus 100 includes a touch sensor array module 110, a touch sensor integrated circuit (IC) 120, a control module 130, a touch determination module 140, a clustering module 150, a position value calculation module 160, a movement information detection module 170, and a user interface 180.

The touch sensor array module 110 is part of the apparatus 100 that is directly touched by a user's fingers. The touch sensor array module 110 may comprise a plurality of electrodes that are arrayed on a single printed circuit board (PCB) or a single flexible PCB (FPCB).

The touch sensor IC 120 calculates the capacitance between the user and the touch sensor array module 110 by measuring a signal that is generated when the touch sensor array module 110 touches a conductive material. Since the capacitance calculated by the touch sensor IC 120 has an analog value, the touch sensor IC 120 converts it into a digital value through analog-to-digital (A/D) conversion or binarization.

Figure 2:
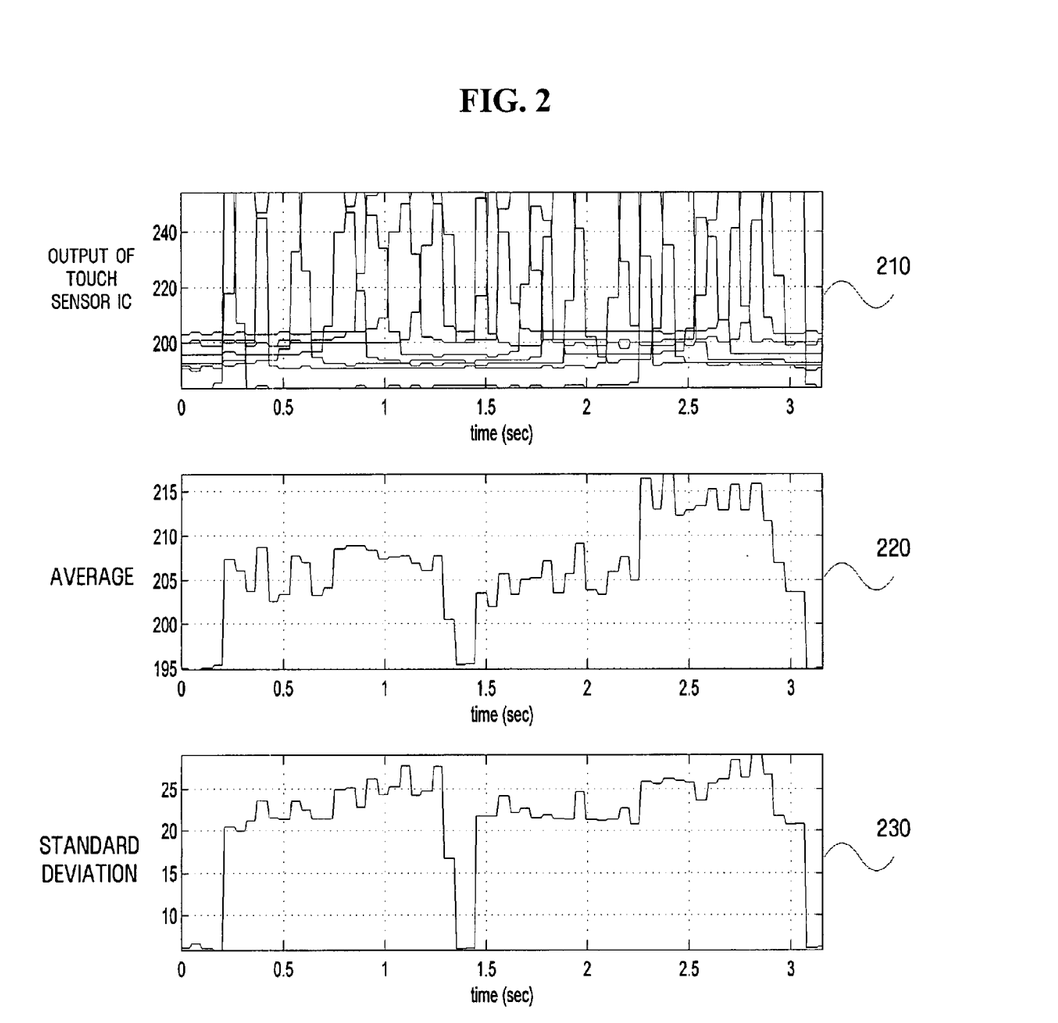
FIG. 2 presents graphs respectively illustrating the output of a touch sensor integrated circuit (IC) illustrated in FIG. 1, the average of the output of the touch sensor IC, and the standard deviation of the output of the touch sensor IC, according to an exemplary embodiment of the present invention.

FIG. 2 presents graphs 210, 220, and 230 respectively illustrating the output of the touch sensor IC 120, the average of the output of the touch sensor IC 120, and the standard deviation of the output of the touch sensor IC 120, according to an exemplary embodiment of the present invention. Specifically, the graph 210 illustrates the variation of the output of the touch sensor IC 120 over time, particularly, the variations of a total of nine channel signals over time, the graph 220 illustrates the average of the output of the touch sensor IC 120, and the graph 230 illustrates the standard deviation of the output of the touch sensor IC 120.

Referring to FIGS. 1 and 2, the touch determination module 140 determines whether or not the user has actually touched a multi-touch sensor with at least one of his/her fingers based on the output of the touch sensor IC 120 in order to prevent the multi-touch sensor from reacting to any arbitrary type of conductive material. According to the present exemplary embodiment, if the standard deviation of a signal measured and output at a time t by the touch sensor IC 120 is larger than a predefined threshold, the touch determination module 140 determines that the user has actually touched the multi-touch sensor with at least one of his/her fingers. Referring to the graph 230, if the standard deviation of the output of the touch sensor IC 120 is maintained to be larger than the predefined threshold during a predetermined time interval, the touch determination module 140 determines that the multi-touch sensor has been touched by the user's finger(s) during the predetermined time interval.

If it is determined that the user has actually touched the multi-touch sensor, the clustering module 150 groups the electrodes of the touch sensor array module 110 into one or more clusters according to a set of standards. The standards are established in consideration of (a) the number of electrodes arrayed in the touch sensor array module 110; (b) the sum of the intensities of digital signals respectively output by the electrodes of the touch sensor array module 110; or (c) the combination of (a) and (b). For example, when the user touches an array of electrodes with two fingers, the electrodes touched by one of the two fingers can be classified into one group, and the electrodes touched by the other finger can be classified into another group. Thereafter, if the sum of the intensities of digital signals output by each of the groups of electrodes is larger than a predetermined value, then the corresponding electrode group may be deemed as a cluster.

Assume that m clusters, i.e., first through m-th clusters $c_1(t), c_2(t), c_3(t), \ldots, c_m(t)$, are generated in the aforementioned manner. In this case, an i-th cluster $c_i(t)$ comprises at least one electrode of the touch sensor array module 110. In other words, the clustering module 150 may group a plurality of adjacent electrodes included in the touch sensor array module 110 into a cluster in order to address the problem of ambiguity that arises when the user touches the touch sensor array module 110 with two or more fingers.

When the user touches the touch sensor array module 110 with more than one finger, the position value calculation module 160 calculates a finger position value indicating the location of the finger of the user that touches the touch sensor array module 110 for each of the m clusters provided by the clustering module 150.

In general, interface devices using a touch sensor use a weighted average method to determine the location of a finger that touches a touch sensor. The calculation of a finger position value using a weighted average method when a user touches a touch sensor with only one finger will hereinafter be described in detail with reference to FIG. 3A.

Figure 3A:
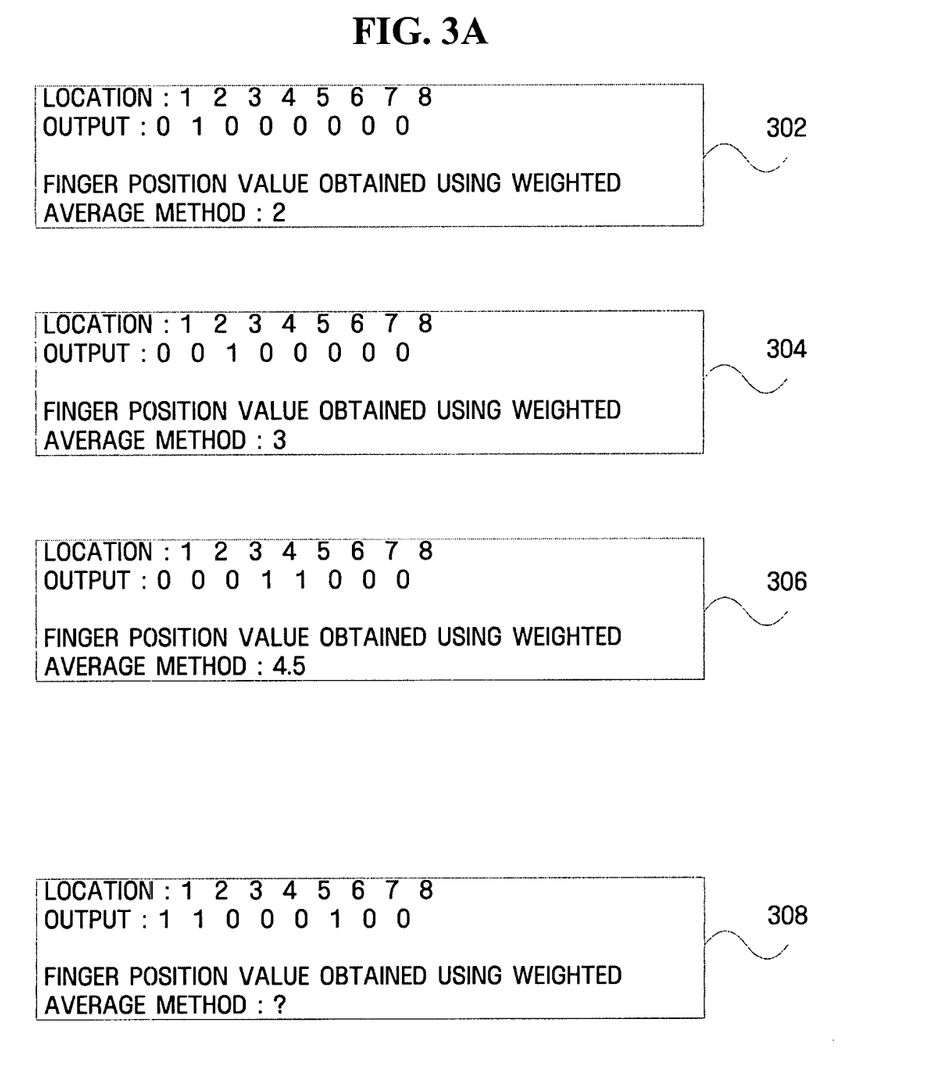
FIG. 3A is a diagram for explaining the determination of a finger position value using a weighted average method when a user touches a multi-touch sensor with only one finger.

Referring to four blocks 302, 304, 306, and 308 illustrated in FIG. 3A, the electrodes of the touch sensor array module 110 are grouped into eight clusters, and an output value of 0 or 1 is obtained for each cluster location. The blocks 302, 304, and 306 illustrate the situation when a user touches the touch sensor array module 110 with only one finger. In detail, referring to the block 302, an output value of 1 is obtained for a second cluster location, and thus, a finger position value of 2 can be obtained using a typical weighted average method. Referring to the block 304, an output value of 1 is obtained for a third cluster location, and thus, a finger position value of 2 can be obtained using the typical weighted average method. Referring to the block 306, an output value of 1 is obtained for the location between fourth and fifth cluster locations, and thus, a finger position value of 4.5 $(=(4+5)/2)$ can be obtained using the typical weighted average method.

On the other hand, the block 308, unlike the blocks 302, 304, and 306, illustrates the situation when the user touches the touch sensor array module 110 with two fingers. A finger position value of 4.5 $(=(1+2+6)/2)$ can be obtained for the situation illustrated in the block 308 according to the typical weighted average method. However, the finger position value of 4.5 does not reflect the exact locations of the two fingers that touch the touch sensor array module 110. Therefore, according to the present exemplary embodiment, a cluster-based weighted average method is used when the user touches the touch sensor array module 110 with two or more fingers, and this will hereinafter be described in detail with reference to FIG. 3B.

Figure 3B:
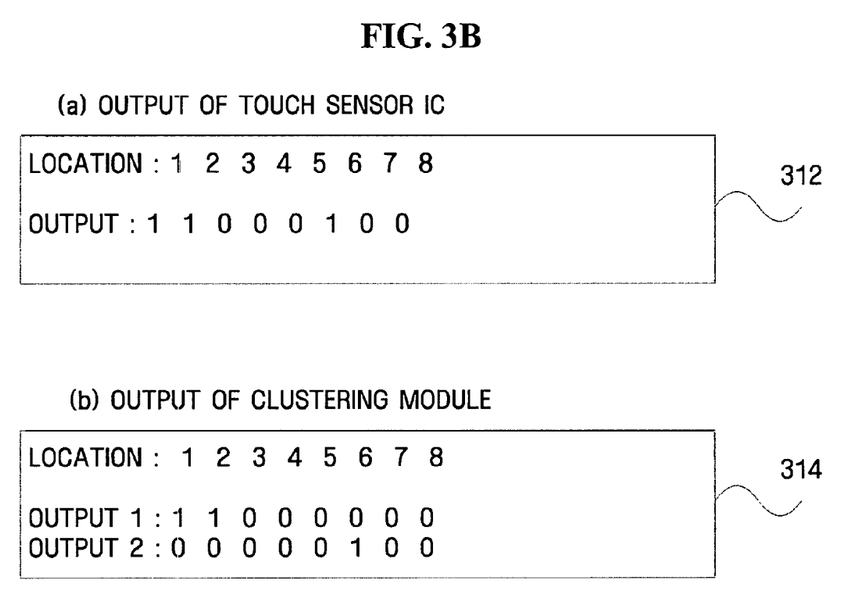
FIG. 3B is a diagram for explaining the determination of finger position values using a weighted average method when the user touches a multi-touch sensor with two fingers.

Referring to block (a) (312) illustrated in FIG. 3B, the touch sensor IC 120 outputs a value of 0 or 1 for each cluster location. Block (b) (314) illustrated FIG. 3B presents the output of the clustering module 150 for each finger that touches the touch sensor array module 110, i.e., output 1 and output 2. In this case, a finger position value of 1.5 is obtained based on output 1, and a finger position value of 6 is obtained based on output 2, thereby providing two separate finger position values.

Figure 4:
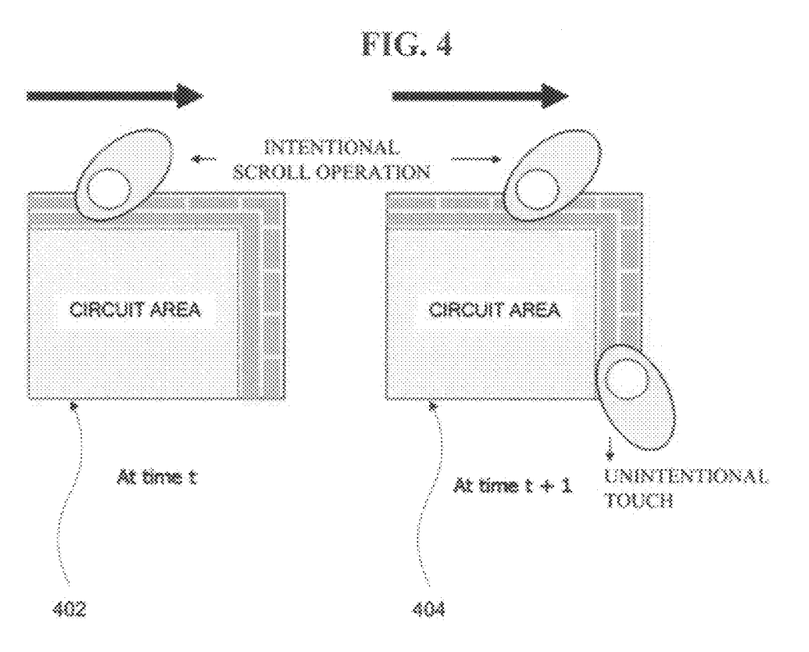
FIG. 4 is a diagram for explaining the situation when a malfunction occurs during a scroll operation using a multi-touch sensor.

When a user performs a scroll operation by manipulating a user interface comprised of a one-dimensional or two-dimensional array of multi-touch sensors such as touch pads, touch slides, or scroll wheels, the user interface may malfunction for various reasons, and this will hereinafter be described in detail with reference to FIG. 4. A left view 402 of FIG. 4 illustrates the situation when a user intentionally performs a scroll operation by appropriately touching a touch sensor with his/her fingers, and a right view 404 of FIG. 4 illustrates the situation when a scroll operation is accidentally performed as a result of an unintentional touch by the user. In general, noise is highly likely to be generated when a user unintentionally or accidentally touches a touch sensor (e.g., when the user tries to put a device equipped with the touch sensor in his/her pocket) or when the user fails to properly touch the touch sensor.

In order to filter out such noise, the position value calculation module 160 calculates a difference between a current finger position value obtained at a time t and a previous finger position value obtained at a time (t-1), thereby determining the displacement of a user's finger over time. This will hereinafter be described in further detail with reference to FIG. 5.

Figure 5:
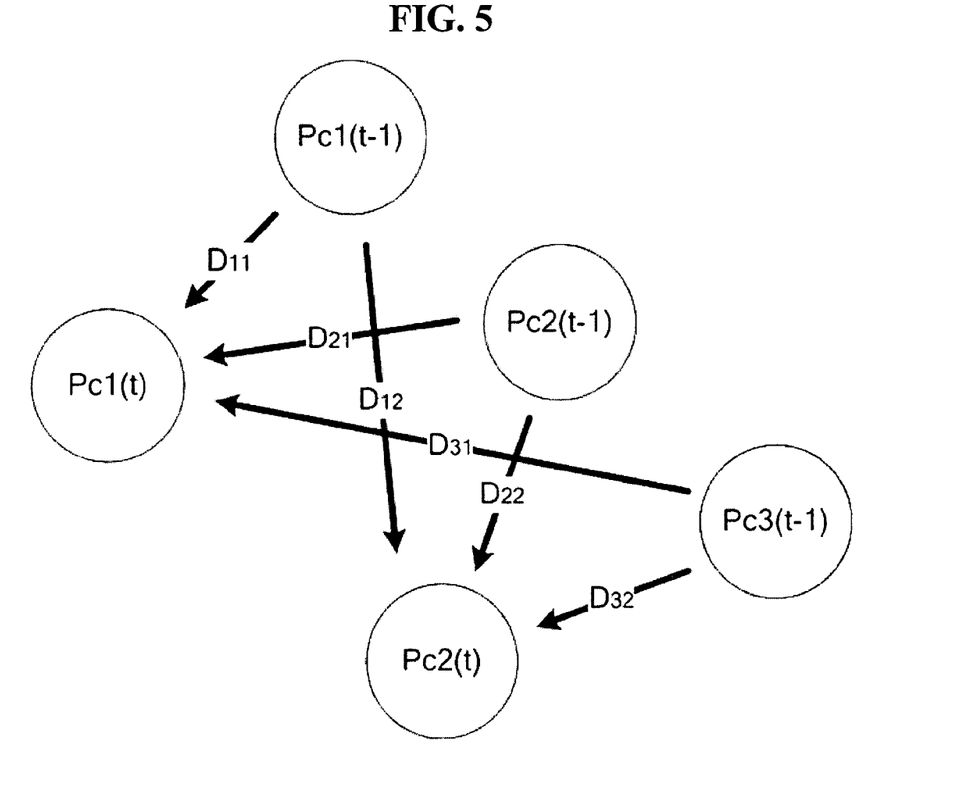
FIG. 5 is a diagram for explaining the determination of the displacement of a user's finger over time based on the displacement between a current finger position value and a previous finger position value.

FIG. 5 is a diagram for explaining the determination of the displacement of a user's finger over time based on the displacement between a current finger position value and a previous finger position value. Referring to FIG. 5, assume that a total of N finger position values are detected at the time t, that Pcj(t) indicates a j-th finger position value of the N finger position values, that a total of M finger position values are detected at the time (t-1), and that Pci(t-1) indicates an i-th finger position value of the M finger position values. For simplicity, further assume that a total of three finger position values, i.e., Pc1(t-1), Pc2(t-1), and Pc3(t-1), are detected at the time (t-1) and that a total of two finger position values, i.e., Pc1(t) and Pc2(t), are detected at the time t. In other words, N=2, and M=3.

A difference between a finger position value detected at the time t and a finger position value detected at the time (t-1) is calculated as indicated by the following equation: $D_{ij}$=Pci(t-1)−Pcj(t) or $D_{ji}$=Pcj(t)−Pci(t-1). Referring to FIG. 5, reference character $D_{11}$ indicates the displacement from Pc1(t-1) to Pc1(t), reference character $D_{21}$ indicates the displacement from Pc2(t-1) to Pc1(t), reference character $D_{31}$ indicates the displacement from Pc3(t-1) to Pc1(t), reference character $D_{12}$ indicates the displacement from Pc1(t-1) to Pc2(t), reference character $D_{22}$ indicates the displacement from Pc2(t-1) to Pc2(t), and reference character $D_{32}$ indicates the displacement from Pc3(t-1) to Pc2(t). The displacements $D_{11}$, $D_{21}$, $D_{31}$, $D_{12}$, $D_{22}$, and $D_{32}$ can be represented as elements of a 3*2 matrix. In this manner, an M*N matrix can be obtained. Alternatively, an N*M matrix can be obtained using the inverse notation of the elements of the M*N matrix.

Referring to FIG. 1, the movement information detection module 170 detects the number of the user's fingers that touch the touch sensor array module 110 and the movement of the fingers based on the finger position values provided by the position value calculation module 160 and variations in the finger position values. For this, the movement information detection module 170 detects a meaningful scroll operation intended by the user using one or more finger position values detected at the time t and one or more finger position values detected at the time (t-1). Here, the meaningful scroll operation is a scroll operation that excludes noise generated by an accidental touch by the user's fingers.

The movement information detection module 170 may detect the movement of only one finger or the movements of two or more fingers according to user settings.

Sometimes, the movement information detection module 170 may not be able to properly determine the movement of fingers simply based on the i-th finger position value Pci(t-1) (i=1, 2, 3) and the j-th finger position value Pcj(t) (j=1, 2). In other words, it is difficult sometimes to determine whether the finger position value Pc1(t) and the finger position value Pc1(t-1) originate from the same finger or from different fingers. According to the present exemplary embodiment, a matrix having distance measures as elements is used to address the aforementioned problem. According to this matrix, a pair of points with the shortest distance is deemed to correspond to the displacement of a finger over time.

In other words, the movement information detection module 170 compares the j-th finger position value pc:j(t), which is detected at the time t, with each of the first through M-th finger position values Pc1(t-1) through PcM(t-1), which are detected at the time (t-1), and determines one of the first through M-th finger position values Pc1(t-1) through PcM(t-1) that is least distant from the j-th finger position value pcj(t) as originating the same finger as the j-th finger position value pcj(t). Referring to FIG. 5, assuming that the movements of two fingers are detected at the time t, one of the displacements $D_{11}$, $D_{21}$, and $D_{31}$ with the shortest distance may be determined as corresponding to the movement of the first finger, and one of the displacements $D_{12}$, $D_{22}$, and $D_{32}$ with the shortest distance may be determined as corresponding to the movement of the second finger.

In this manner, the movement information detection module 170 can extract information regarding a scroll operation performed by two or more intentional finger touches on the touch sensor array module 110 and can filter out unintentional finger touches on the touch sensor array module 110. Information regarding intentional touches by the user's fingers comprises the number of fingers that produce the intentional finger touch on the touch sensor array module 110 and the number of fingers that are currently moving on the touch sensor array module 110, and this will hereinafter be described in detail with reference to FIG. 6.

Figure 6:
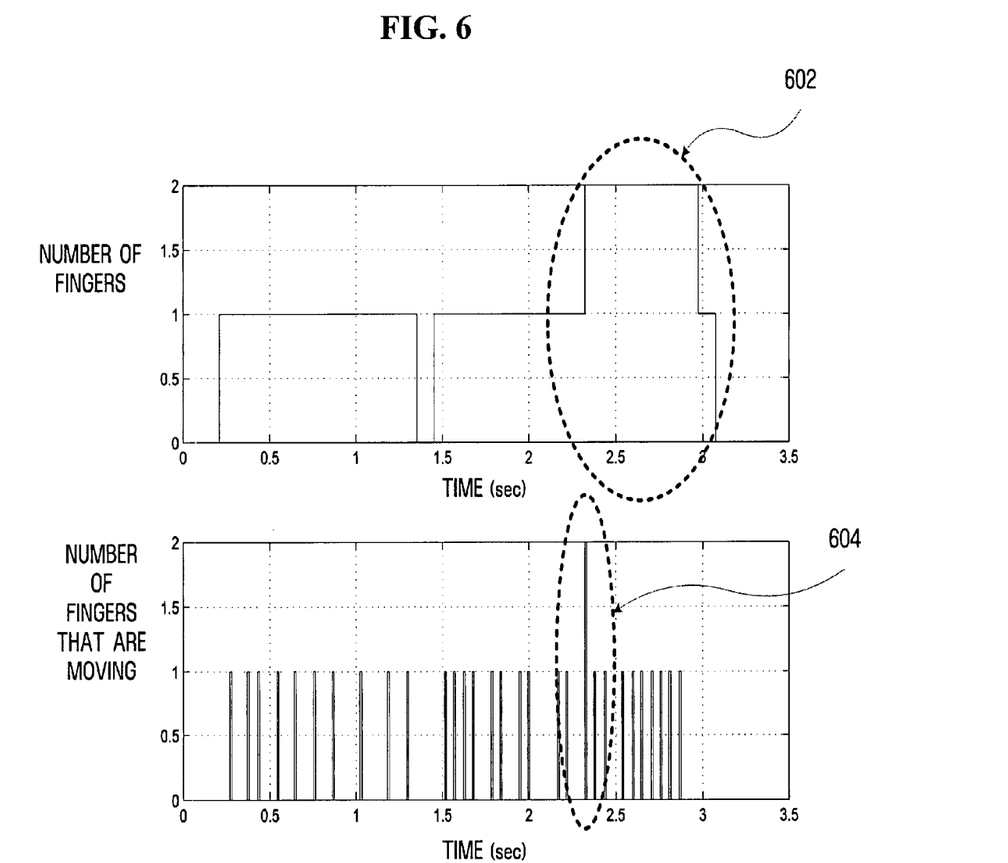
FIG. 6 presents graphs for explaining the detection of the number of a user's fingers that touch a multi-touch sensor and the number of the user's fingers that are moving on the multi-touch sensor using a method of sensing the movement of fingers using a multi-touch sensor according to an exemplary embodiment of the present invention.

FIG. 6 presents graphs 602 and 604 for explaining the detection of the number of a user's fingers that touch a multi-touch sensor and the number of the user's fingers that are moving on the multi-touch sensor using a method of sensing the movement of fingers using a multi-touch sensor according to an exemplary embodiment of the present invention. Specifically, the upper graph 602 of FIG. 6 illustrates variations in the number of the user's finger that touch the multi-touch sensor. Referring to the upper graph 602 of FIG. 6, only one finger is detected until around 2.3 sec, and two fingers are detected between 2.3 sec and 3 sec due to an accidental touch by the user's fingers. Referring to the lower graph 604 of FIG. 6, two moving fingers are detected at around 2.3 sec. According to the present exemplary embodiment, it is possible to precisely determine the positions of the user's fingers that are moving on a multi-touch sensor regardless of noise generated due to an unintentional touch by the user's fingers.

Figure 7:
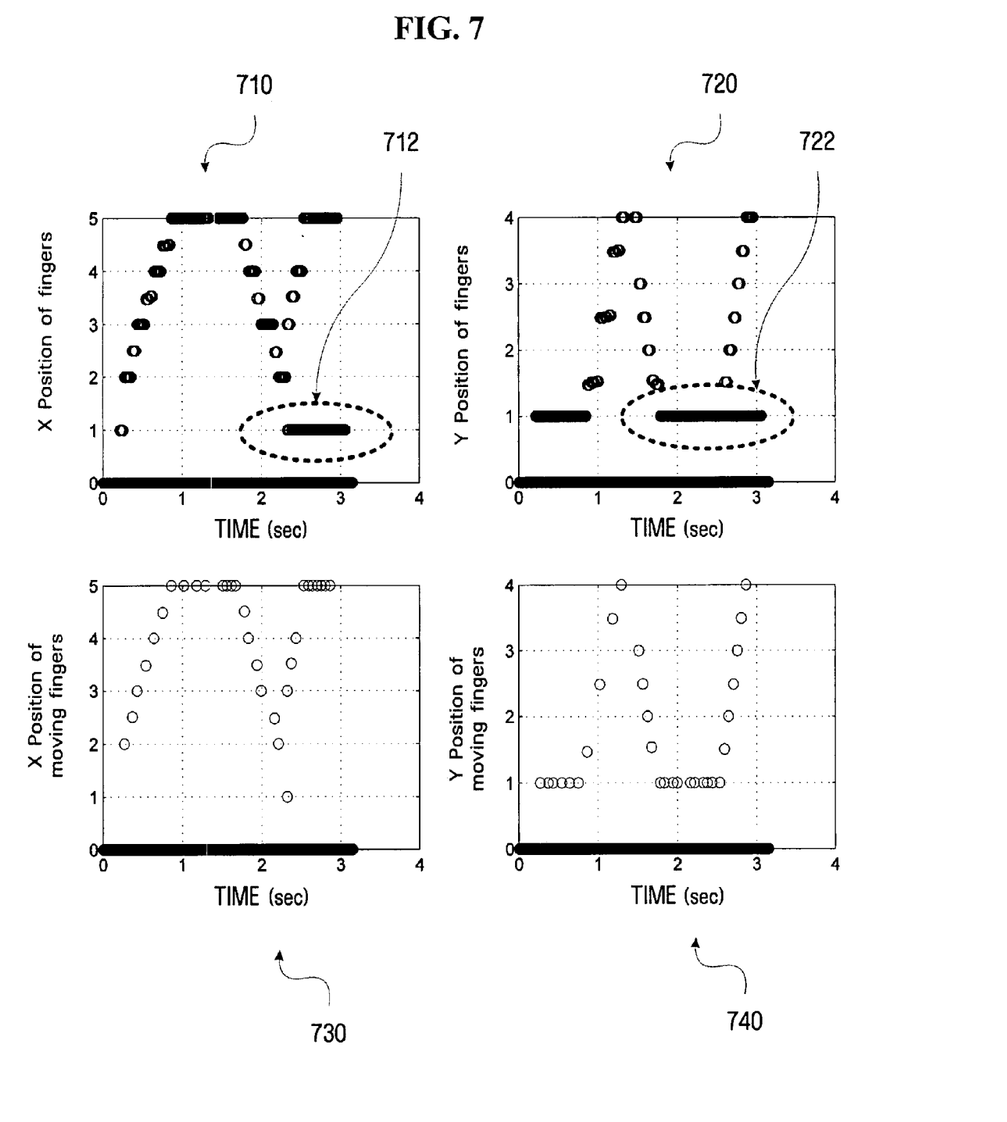
FIG. 7 presents graphs for explaining the determination of the positions of a user's fingers that touch a multi-touch sensor and the positions of the user's fingers that are moving on the multi-touch sensor using a method of sensing the movement of fingers using a multi-touch sensor according to an embodiment of the present invention.

FIG. 7 presents graphs 710, 720, 730, and 740 for explaining the determination of the positions of a user's fingers that touch a multi-touch sensor and the positions of the user's fingers that are moving on the multi-touch sensor using a method of sensing the movement of fingers using a multi-touch sensor according to an exemplary embodiment of the present invention. Experimental results illustrated in FIG. 7 were obtained by a device equipped with an inversed L-shaped multi-touch sensor. FIG. 7 illustrates the situation where the user accidentally touches an arbitrary portion of the inversed L-shaped multi-touch sensor while scrolling back and forth between an upper left portion to a lower right portion of the inversed L-shaped multi-touch sensor with one finger (hereinafter referred to as the scrolling finger), thereby generating noise.

Referring to the graphs 710, 720, 730, and 740, assume that the X-axis represents a horizontal portion of the inversed L-shaped multi-touch sensor and that the Y-axis represents a vertical portion of the inversed L-shaped multi-touch sensor. The graph 710 illustrates variations in the X-axis position of the scrolling finger, and the graph 720 illustrates variations in the Y-axis position of the scrolling finger.

Referring to the graphs 710 and 720, between zero (0) sec and around 0.9 sec, the X-axis displacement of the scrolling finger increases, and the Y-axis displacement of the scrolling finger remains constant. Between around 0.9 sec and around 1.8 sec, the user scrolls down on the inversed L-shaped multi-touch sensor. Thus, between around 0.9 sec and around 1.8 sec, the X-axis displacement of the scrolling finger remains constant, and the Y-axis displacement of the scrolling finger gradually increases until the scrolling finger returns to the top of the inversed L-shaped multi-touch sensor. Between around 1.8 sec and around 2.4 sec, the user scrolls back to the left. Thus, between around 1.8 sec and around 2.4 sec, the X-axis displacement of the scrolling finger remains decreases, and the Y-axis displacement of the scrolling finger remains constant. Between around 2.4 sec and around 3.0 sec, the user scrolls to the right and then scrolls down. Thus, between around 2.4 sec and around 3.0 sec, the X-axis displacement of the scrolling finger gradually increases to some extent and then remains constant, and the Y-axis displacement of the scrolling finger remains constant for a while and then begins to increase.

Referring to the graphs 710 and 720, an area 712 where X-axis displacement remains constant and an area 722 where Y-axis displacement remains constant both appear between around 2 sec and around 3 sec. The areas 712 and 722 correspond to noise generated while the user scrolls back and forth on the multi-touch sensor.

The graph 730 illustrates variations in the X-axis position of the scrolling finger, and the graph 740 illustrates variations in the Y-axis position of the scrolling finger. The graphs 730 and 740 are obtained by respectively removing the areas 712 and 722 from the graphs 710 and 720 and can thus represent a scroll operation intended by the user. Detailed descriptions of the graphs 730 and 740 will be skipped.

Referring to FIG. 1, the control module 130 receives a signal output by the touch sensor IC 120, and pro)/ides the received signal to the touch determination module 140. Also, the control module 130 receives information regarding the scroll movement of the user's fingers from the movement information detection module 170, and provides the received information to the user interface 180.

Figure 8:
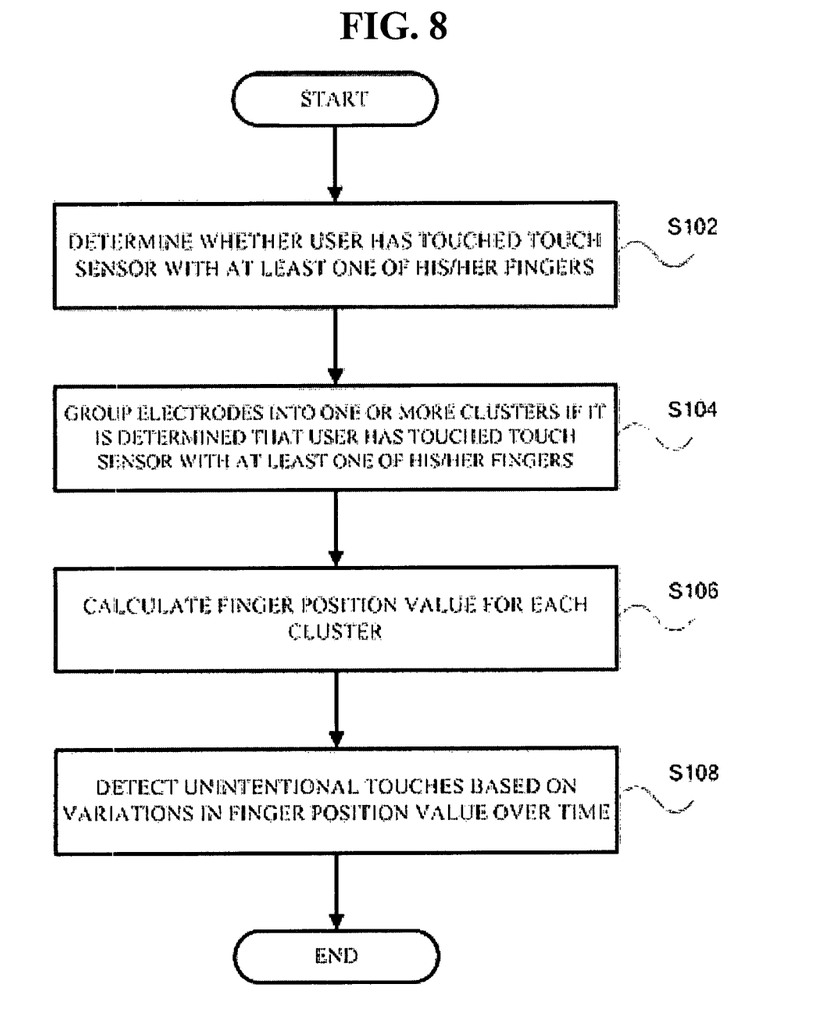
FIG. 8 is a flowchart illustrating a method of sensing the movement of fingers using a multi-touch sensor according to an exemplary embodiment of the present invention.

FIG. 8 is a flowchart illustrating a method of sensing the movement of fingers using a multi-touch sensor according to an exemplary embodiment of the present invention. Referring to FIG. 8, the touch sensor IC 120 calculates capacitance generated when a user touches the touch sensor array module 110 with his/her finger, digitizes the result of the calculation, and measures a signal obtained by the digitization. Thereafter, in operation S102, the touch determination module 140 determines whether or not the user has actually touched the multi-touch sensor with at least one of his/her fingers. Preferably, if the standard deviation of the measured signal is larger than a predefined threshold, the touch determination module 140 may determine that the user has actually touched the multi-touch sensor with at least one of his/her fingers.

In operation S104, if it is determined in operation S102 that the user has actually touched the multi-touch sensor with at least one of his/her fingers, the clustering module 150 groups a plurality of electrodes arrayed in the multi-touch sensor into one or more clusters according to a set of standards.

In operation S106, the position value calculation module 160 calculates a finger position value for each of the clusters obtained in operation S106. Preferably, the position value calculation module 160 may calculate the finger position values for the respective clusters using a cluster-based weighted average algorithm and determine the displacement between a current finger position value and a previous finger position value based on the results of the calculation.

In operation S108, the movement information detection module 170 detects movement information of the user's finger that touches the touch sensor based on the displacement between the current finger position value and the previous finger position value. Accordingly, unintentional touches based on variations in finger position value over time can be detected.

A computer-readable recording medium storing program code for executing the method of sensing the movement of fingers using a multi-touch sensor according to the present invention is within the scope of the present invention.

In addition to the above-described exemplary embodiments, exemplary embodiments of the present invention can also be implemented by executing computer readable code/instructions in/on a medium/media, e.g., a computer readable medium/media. The medium/media can correspond to any medium/media permitting the storing and/or transmission of the computer readable code/instructions. The medium/media may also include, alone or in combination with the computer readable code/instructions, data files, data structures, and the like. Examples of code/instructions include both machine code, such as produced by a compiler, and files containing higher level code that may be executed by a computing device and the like using an interpreter.

The computer readable code/instructions can be recorded/transferred in/on a medium/media in a variety of ways, with examples of the medium/media including magnetic storage media (e.g., floppy disks, hard disks, magnetic tapes, etc.), optical media (e.g., CD-ROMs, DVDs, etc.), magneto-optical media (e.g., floptical disks), hardware storage devices (e.g., read only memory media, random access memory media, flash memories, etc.) and storage/transmission media such as carrier waves transmitting signals, which may include computer readable code/instructions, data files, data structures, etc. Examples of storage/transmission media may include wired and/or wireless transmission media. For example, storage/transmission media may include optical wires/lines, waveguides, and metallic wires/lines, etc. including a carrier wave transmitting signals specifying instructions, data structures, data files, etc. The medium/media may also be a distributed network, so that the computer readable code/instructions are stored/transferred and executed in a distributed fashion. The medium/media may also be the Internet. The computer readable code/instructions may be executed by one or more processors. The computer readable code/instructions may also be executed and/or embodied in at least one application specific integrated circuit (ASIC) or Field Programmable Gate Array (FPGA).

In addition, one or more software modules or one or more hardware modules may be configured in order to perform the operations of the above-described exemplary embodiments.

The term "module", as used herein, denotes, but is not limited to, a software component, a hardware component, or a combination of a software component and a hardware component, which performs certain tasks. A module may advantageously be configured to reside on the addressable storage medium/media and configured to execute on one or more processors. Thus, a module may include, by way of example, components, such as software components, application specific software component, object-oriented software components, class components and task components, processes, functions, operations, execution threads, attributes, procedures, subroutines, segments of program code, drivers, firmware, microcode, circuitry, data, databases, data structures, tables, arrays, and variables. The functionality provided for in the components or module, may be combined into fewer components or modules or may be further separated into additional components or modules. Further, the components or modules can operate at least one processor (e.g. central processing unit (CPU)) provided in a device. In addition, examples of a hardware component include an application specific integrated circuit (ASIC) and Field Programmable Gate Array (FPGA). As indicated above, a module can also denote a combination of a software component(s) and a hardware component(s).

The computer readable code/instructions and computer readable medium/media may be those specially designed and constructed for the purposes of the present invention, or they may be of the kind well-known and available to those skilled in the art of computer hardware and/or computer software.

According to the present invention, it is possible to effectively extract a valid operation (e.g. scroll operation) by filtering out unintentional touches by a user's hand. Also, according to the present invention, there is no limitation in the number of a user's fingers whose movements over time can be detected at a time, and thus, it is possible to improve the usability of user interfaces using touch sensors.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. An apparatus for sensing movements of a plurality of fingers, the apparatus comprising:
    a touch sensor which is configured to receive a plurality of touch inputs; and
    a controller which is configured to calculate finger position values indicating locations of the plurality of fingers that touches the touch sensor, and determine movement information of the plurality of fingers based on variations over time in the finger position values and if at least one touch input related to the movements is intentional, generate an input signal corresponding to the at least one touch input,
    wherein the controller calculates distances between a current finger position and a plurality of previous finger positions, compares the distances, and determines, based on the compared distances, which one of the plurality of previous finger positions is intentionally touched, and
    wherein the controller compares a j-th finger position value Pcj(t) of N finger position values detected at a current time t with the first through M-th finger position values $Pc_1(t-1)$ through $Pc_M(t-1)$ detected at a previous time (t-1), and determines whichever of the first through M-th finger position values $Pc_1(t-1)$ through $Pc_M(t-1)$ is least distant from the j-th finger position value Pcj(t) as displacement corresponding to movement of a j-th finger of a user.

2. The apparatus of claim 1 further comprising a touch sensor integrated circuit (IC) which is configured to calculate capacitance generated when a user touches the touch sensor with the plurality of fingers, digitize the result of the calculation, output a signal obtained by the digitization, and measure the output signal.

3. The apparatus of claim 2, wherein the controller determines that the user has actually touched the touch sensor with the plurality of fingers if the standard deviation of the measured output signal is larger than a predefined threshold.

4. The apparatus of claim 1, wherein a plurality of electrodes arrayed in the touch sensor are grouped into one or more clusters based on the number of electrodes arrayed in the touch sensor, the sum of the intensities of digital signals respectively output by the electrodes of the touch sensor, or the combination thereof.

5. The apparatus of claim 4, wherein the controller calculates the finger position values by applying a weighted average to each of the clusters.

6. The apparatus of claim 1, wherein the displacement between the current finger position and the plurality of previous finger positions can be determined as indicated by the following equation: $D_{ij}=Pc_j(t-1)-Pc_i(t)$ or $D_{ij}=Pc_j(t)-Pc_i(t-1)$ where $Pc_j(t)$ indicates the j-th finger position value of N finger position values detected at the current time t, and $Pc_i(t-1)$ indicates an i-th finger position value of M finer position values detected at the previous time (t-1),
    wherein the displacement between the current finger position and the plurality of previous finger positions can be represented by an M*N matrix or an N*M matrix having $D_{ij}$ or $D_{ji}$ as an element.

7. The apparatus of claim 1, wherein the controller extracts information regarding intentional touches by the plurality of fingers using the determined displacement.

8. The apparatus of claim 7, wherein the information regarding intentional touches by the plurality of fingers comprises the number of at least one finger that intentionally touches the touch sensor and the number of the plurality of fingers that are moving on the touch sensor.

9. A method of sensing movements of a plurality of fingers, the method comprising:
    (a) receiving a plurality of touch inputs on a touch sensor;
    (b) calculating finger position values indicating locations of the plurality of fingers that touch the touch sensor; and
    (c) determining movement information of the plurality of fingers based on variations over time in the finger position values and if at least one touch input related to the movements is intentional, generating an input signal corresponding to the at least one touch input,
    wherein (c) further comprises calculating distance between a current finger position and plurality of a previous finger positions, comparing the distances, and determining, based on the compared distances, which one of the plurality of previous finger positions is intentionally touched position, and
    wherein (c) comprises:
    (d1) a j-th finger position value Pcj(t) of N finger position values detected at a current time t with the first through M-th finger position values $Pc_1(t-1)$ through $Pc_M(t-1)$ detected at a previous time (t-1), and determining whichever of the first through M-th finger position values $Pc_1(t-1)$ through $Pc_M(t-1)$ is least distant from the j-th finger position value Pcj(t) as displacement corresponding to movement of a j-th finger of a user; and
    (d2) filtering out unintentional touches by the user's fingers by extracting information regarding intentional touches by the plurality of fingers using the displacement determined in (d1).

10. The method of claim 9, wherein (a) comprises calculating capacitance generated when a user touches the touch sensor with the plurality of fingers, digitizing the result of the calculation, outputting a signal obtained by the digitization, and measuring the output signal.

11. The method of claim 10, wherein (a) further comprises determining that the user has actually touched the touch sensor with the plurality of fingers if the standard deviation of the measured output signal is larger than a predefined threshold.

12. The method of claim 9, wherein a plurality of electrodes arrayed in the touch sensor are grouped into one or more clusters based on the number of electrodes arrayed in the touch sensor, the sum of the intensities of digital signals respectively output by the electrodes of the touch sensor, or the combination thereof.

13. The method of claim 12, wherein (b) comprises calculating the finger position values by applying a weighted average to each of the clusters.

14. The method of claim 9, wherein the displacement between the current finger position and the plurality of previous finger positions can be determined as indicated by the following equation: $D_{ij}=Pcj(t-1)-Pcj(t)$ or $D_{ji}=Pcj(t)-Pci(t-1)$ where Pcj(t) indicates the j-th finger position value of N finger position values detected at the current time t, and Pci(t-1) indicates an i-th finger position value of M finer position values detected at the previous time (t-1), wherein the displacement between the current finger position and the plurality of previous finger positions can be represented by an M*N matrix or an N*M matrix having $D_{ij}$ or $D_{ji}$ as an element.

15. The method of claim 9, wherein the information regarding intentional touches by the plurality of fingers comprises the number of at least one finger that intentionally touch the touch sensor and the number of the plurality of fingers that are moving on the touch sensor.

16. At least one non-transitory computer readable medium storing computer readable instructions that control at least one processor to implement the method of claim 9.

* * * * *